Figure 1:
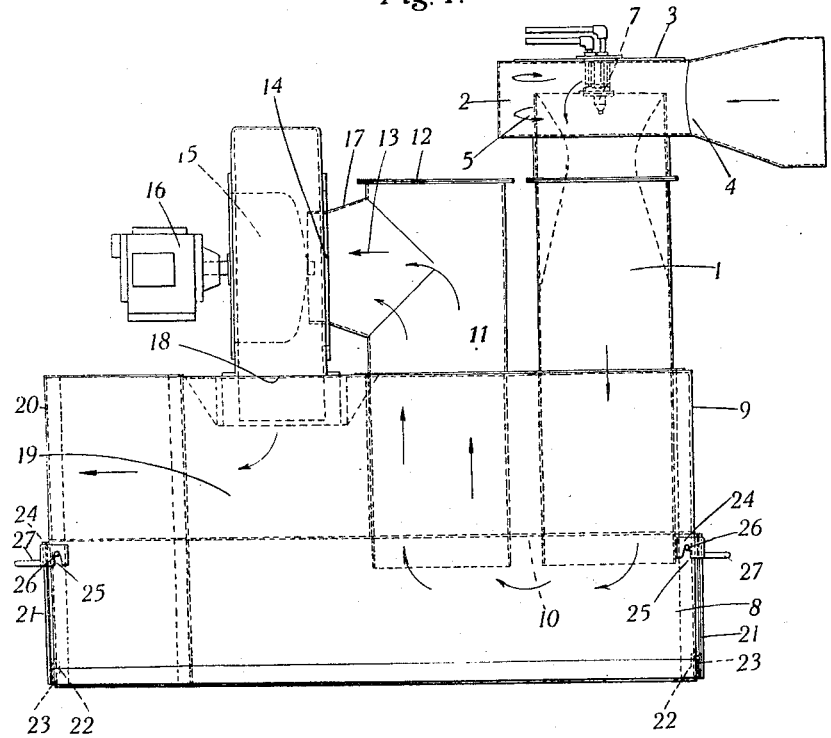

May 14, 1940. T. G. NYBORG 2,200,891

DUST EXTRACTION

Filed Nov. 16, 1937

Tage G. Nyborg INVENTOR

BY

ATTORNEY

Patented May 14, 1940

2,200,891

UNITED STATES PATENT OFFICE 2,200,891

DUST EXTRACTION

Tage Georg Nyborg, Worcester, England, assignor of one-half to The Mining Engineering Company Limited, Worcester, England Application November 16, 1937, Serial No. 174,865
In Great Britain November 21, 1936

4 Claims. (Cl. 183—21)

This invention relates to the extraction of dust from air and gases and has particular though not exclusive application to the collecting of coal dust at such points as conveyor loading points.

Attempts have been made to extract dust particles suspended in a stream of air or gases by spraying the stream with water or steam jets, the intention being to wet the particles and so increase their effective weight beyond that which can be supported by the gaseous stream. These attempts have hitherto been successful only to a very limited extent, due, it is believed to the difficulty of obtaining efficient wetting of the dust particles.

The present invention is based on experiments which have shown that intimate mixing of dust and water particles can be obtained by directing a fine, gradually divergent water spray along the axis of a mixing tube through which the dust laden air stream is passed with a rotary movement of the air about the tube axis. When the characteristics of the air stream and the shape and position of the spray nozzle are suitably selected for efficient extraction of the dust from the air, the dust-and-water particles form a rather firm sludge which is deposited on the sides of the tube and builds up into a vena contracta form.

It is an object of the invention to provide methods for the extraction of dust from air and gases based upon these experimental results.

Further, in addition to obtaining the rotary motion of the air column about the axis of the tube, conditions are preferred which will tend to give the dust laden air a subsidiary rotation about ring axes which lie in planes perpendicular to the axis of the tubes. The subsidiary vortex movement of the air serves to bring the dust particles into intimate contact with the water spray and to improve the wetting of the particles.

The rotary motion of the air column in the mixing tube can be produced in any suitable manner. In one form of apparatus, the air stream is led tangentially into an annular chamber into which the end of the mixing tube projects axially so that the air is given a rotary motion in the annular chamber which is translated into a vortex motion in the mixing tube. The mixing tube is preferably eccentrically arranged with regard to the annular chamber so that the cross-section of the air stream is gradually reduced as it passes round the chamber.

Other objects of the invention will be clear from the description which follows and from the claiming clauses.

Figure 2:
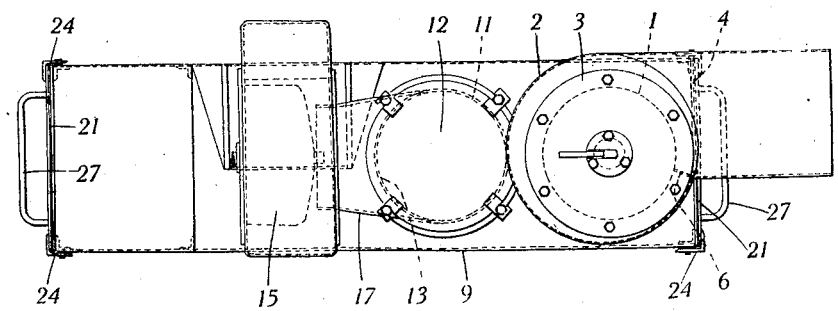

A specific form of dust extractor, the new or improved features, combinations and arrangements of parts of which form in themselves parts of the invention, will now be described in some detail with reference to the accompanying drawing in which:

Fig. 1 is a side view of a dust extractor, and
Fig. 2 is a plan view.

In this form, a mixing tube 1 comprising an open-ended metal cylinder is arranged with its axis vertical. The upper end of this tube 1 projects into the base of a cylinder 2 of larger diameter than the tube 1, this cylinder 2 being closed at the top by a plate 3 and having a tangential inlet 4 in its side wall.

Between the side wall of the cylinder 2 and the upper end of the tube 1 is thus formed an annular chamber 5. The axis of the tube 1 and of the cylinder 2 are parallel but are somewhat displaced so that the annular chamber 5 is of gradually narrowing section, the narrowest part being near the tangential inlet. A partition 6 is arranged across this narrowest part between the cylinder 2 and the tube 1 so as to direct air entering through the tangential inlet 4 in one direction around the annular chamber 5 so that the cross-section of the air stream round the annular chamber gradually decreases.

A spray nozzle 7 is mounted in the top plate 3 coaxially with the tube 1 and is arranged to direct a fine gradually divergent spray of water along the axis of the tube 1. The spray is of such an angle that the water does not come into contact with the side of the tube 1 for at least a considerable length of the tube.

The lower end of the mixing tube 1 projects into a depositing chamber 8. This chamber is, in the form shown, formed by the lower part of a casing 9 divided into two parts by a partition plate 10. The mixing tube 1 passes through the upper part of the casing 9 and through the partition plate and opens into the chamber 8.

A vertical tube 11, parallel to the mixing tube 1, also opens into the depositing chamber 8 and passes through the upper part of the casing 9. This tube 11 is closed at the top by a plate 12 and has an outlet 13 in the side thereof. This outlet 13 is connected by a short horizontal tube 17 to the inlet 14 of an extractor fan 15 driven by an electric or other motor 16 mounted on the top of the casing 9. The fan 15 exhausts through its outlet 18 into the upper part 19 of the casing 9 from which there is an outlet 20 to the atmosphere at one end of the casing.

The depositing chamber 8 is closed at each end by doors 21 which are readily removable but substantially air-tight. Each door has projecting hooks 22 which fit over the edge of a rim 23 at the bottom of the opening into the chamber and brackets 24 at each side. These brackets are formed with tapered slots 25 in their lower edges which engage with pins 26 at the top of the chamber 8. The doors can be readily removed by lifting them vertically by means of the handles 27 and as readily replaced, the sides of the tapered slots 25 engaging the pins 26 and drawing the doors in a substantially airtight manner against the casing 9.

The dust-laden air is drawn into the extractor by means of the fan 15. It enters through the tangential inlet 4, passes round the annular chamber 5 being thus given a rotary movement and then passes down the mixing tube 1. In passing from the annular chamber 5 to the tube 1, the air appears to be given a subsidiary rotary movement about ring axes concentric with the axis of the tube. The air passing down the tube 1 retains its rotary motion and in effect creates a vortex system in the tube, this vortex system comprising a main vortex rotating about the axis of the tube and subsidiary vortices rotating about ring axes in planes perpendicular to the axis of the tube.

The fine spray of water from the spray nozzle 7 occupies the centre of the main vortex system and dust particles in the air come into intimate contact with the water particles and are thoroughly wetted. The wetted particles adhere to the wall of the tube 1 and form a rather firm sludge which builds up on the tube wall in the form of a vena contracta somewhat of the general shape shown in dotted lines in Fig. 1.

The sludge builds up on the wall towards the centre of the tube until the vena contracta is formed (actually with a rough surface after the fashion of small breaking waves coming into a beach) and thereafter pieces of the sludge (representing the crests of the waves) break off from the deposit (and fresh waves build up) so that the tube becomes self-cleaning. The sludge breaking off falls into the depositing chamber 8 from which it can be removed through the doors 21.

The air passes into the depositing chamber 8 which is of greater cross-sectional area than the tube 1 so that wetted dust still carried by the air stream drops out into the depositing chamber because of the decrease in the air velocity. From the depositing chamber, the air stream passes up the tube 11 and through the extractor fan 15 into the part 19 of the casing 9 and thence to the outside of the apparatus through the outlet 20.

I claim:

1. Apparatus for extracting and collecting dust from air or gases comprising a chamber, a mixing tube open at its end projecting into the chamber and forming therewith an annular space, means for leading dust laden air tangentially into this annular space so as to impart a rotary motion to the air, and causing the rotating air to pass inwardly into the mixing tube over the projecting end thereof so that a vortex is formed tending to throw dust particles towards the center thereof, and a spray nozzle arranged near the entrance to the mixing tube to deliver a fine water spray along the axis of the vortex thus formed in the direction of its general movement.

2. Apparatus for extracting and collecting dust from air or gases comprising a chamber, a mixing tube open at its end projecting into the chamber and forming therewith an annular space, means for leading dust laden air tangentially into this annular space so as to impart a rotary motion to the air, and causing the rotating air to pass inwardly into the mixing tube over the projecting end thereof so that a vortex is formed tending to throw dust particles towards the center thereof, a spray nozzle arranged near the entrance to the mixing tube to deliver a fine water spray along the axis of the vortex thus formed in the direction of its general movement and a depositing chamber to receive and retain dust-and-water particles from the mixing tube and arranged to be traversed by the air before it emerges.

3. Apparatus for the extraction and collection of dust from dust-laden air or gases comprising an annular chamber having a tangential inlet and a substantially axial outlet, a mixing tube coaxial with this outlet and projecting into the annular chamber so that the air passing through the mixing tube is caused to rotate as a whole about the axis of the tube and to enter it with an inward rotational movement, a spray nozzle arranged to direct a fine spray along the axis of the mixing tube, in the general direction of travel of the air and a chamber arranged to receive sludge coming away from the wall of the mixing tube.

4. Apparatus for extracting and collecting dust from air or gases as defined in claim 3 in which the mixing tube is arranged so that the general direction of flow of air through the tube is downwards.

TAGE GEORG NYBORG.